United States Patent [19]
Darringer et al.

[11] Patent Number: 5,076,197
[45] Date of Patent: Dec. 31, 1991

[54] TEMPERATURE INDICATOR

[75] Inventors: R. E. Darringer, Newport Beach; Leo J. Gibbons, Fullerton, both of Calif.

[73] Assignee: Telatemp Corporation, Fullerton, Calif.

[21] Appl. No.: 623,032

[22] Filed: Dec. 6, 1990

[51] Int. Cl.$^5$ ............................................. G01K 5/70
[52] U.S. Cl. .................................... 116/221; 374/106; 374/187; 426/88
[58] Field of Search ........... 116/221; 374/104, 106 X, 374/186, 187 X, 205; 337/62, 79, 298, 376; 426/88 X

[56]     References Cited
U.S. PATENT DOCUMENTS

| | | | |
|---|---|---|---|
| 1,682,498 | 8/1928 | Gano . | |
| 2,046,186 | 6/1936 | Saul . | |
| 2,259,139 | 10/1941 | Gardner | 374/106 |
| 2,335,081 | 11/1943 | Platz | 337/062 |
| 2,349,008 | 5/1944 | Sauter . | |
| 2,362,424 | 11/1944 | Walsh | 116/225 |
| 3,290,942 | 12/1966 | Carbaugh | 116/221 X |
| 3,479,876 | 11/1969 | Kliewer | 426/88 X |
| 3,483,748 | 12/1969 | Rogen et al. . | |
| 3,622,932 | 11/1971 | Canavellis | 337/376 |
| 3,947,758 | 3/1976 | Sutton | 374/205 X |
| 4,064,827 | 12/1977 | Darringer et al. | 116/221 |
| 4,091,763 | 5/1978 | Snider | 116/221 |
| 4,649,859 | 3/1987 | Janke et al. | 116/221 X |

FOREIGN PATENT DOCUMENTS 2638416 3/1978 Fed. Rep. of Germany ...... 116/221

Primary Examiner—William A. Cuchlinski, Jr.
Assistant Examiner—G. Bradley Bennett
Attorney, Agent, or Firm—Knobbe, Martens, Olson & Bear

[57]     ABSTRACT

A low cost device which changes rapidly, significantly, irreversibly, and accurately when it is exposed to a predetermined temperature is disclosed. The device of the present invention employs a bimetallic disk which changes its configuration when it is exposed to a predetermined temperature. Before firing, the disk is captured by a recess in the device casing. When the disk is exposed to a predetermined temperature, it changes configuration and escapes its confinement from its orginal location in the recess. A spring propels the disk from its original location to a different location. Additionally, the spring ensures that the disk cannot return to its original location. This device has a minimal number of parts so that it is easily and inexpensively manufactured. It can be configured to sense either high temperature or low temperature. The low temperature device can be used in conjuction with irreversible temperature labels such that the combination records both a high and a low temperature exposure. Additionally, the device can be locked such that it does not register exposure to a predetermined temperature until the device is activated for use.

33 Claims, 6 Drawing Sheets

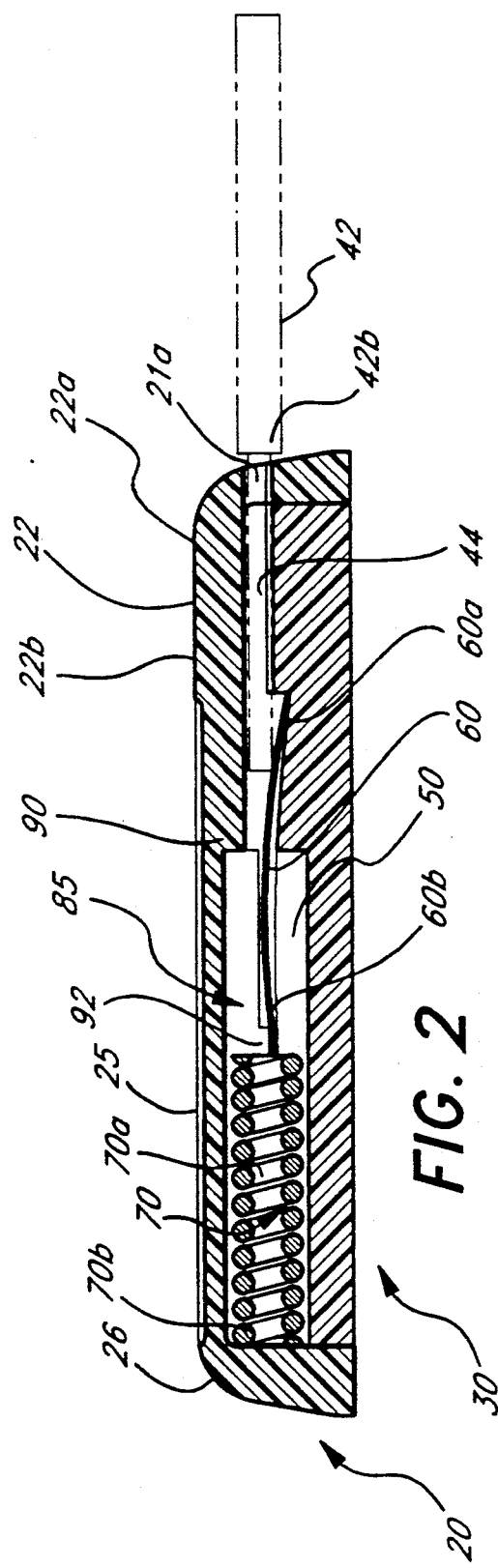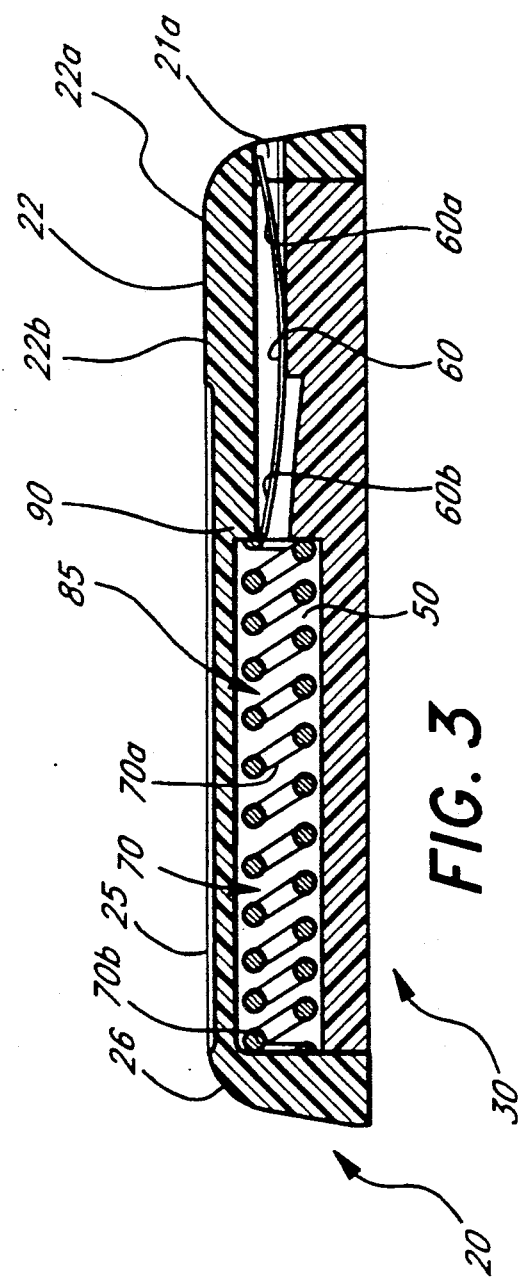

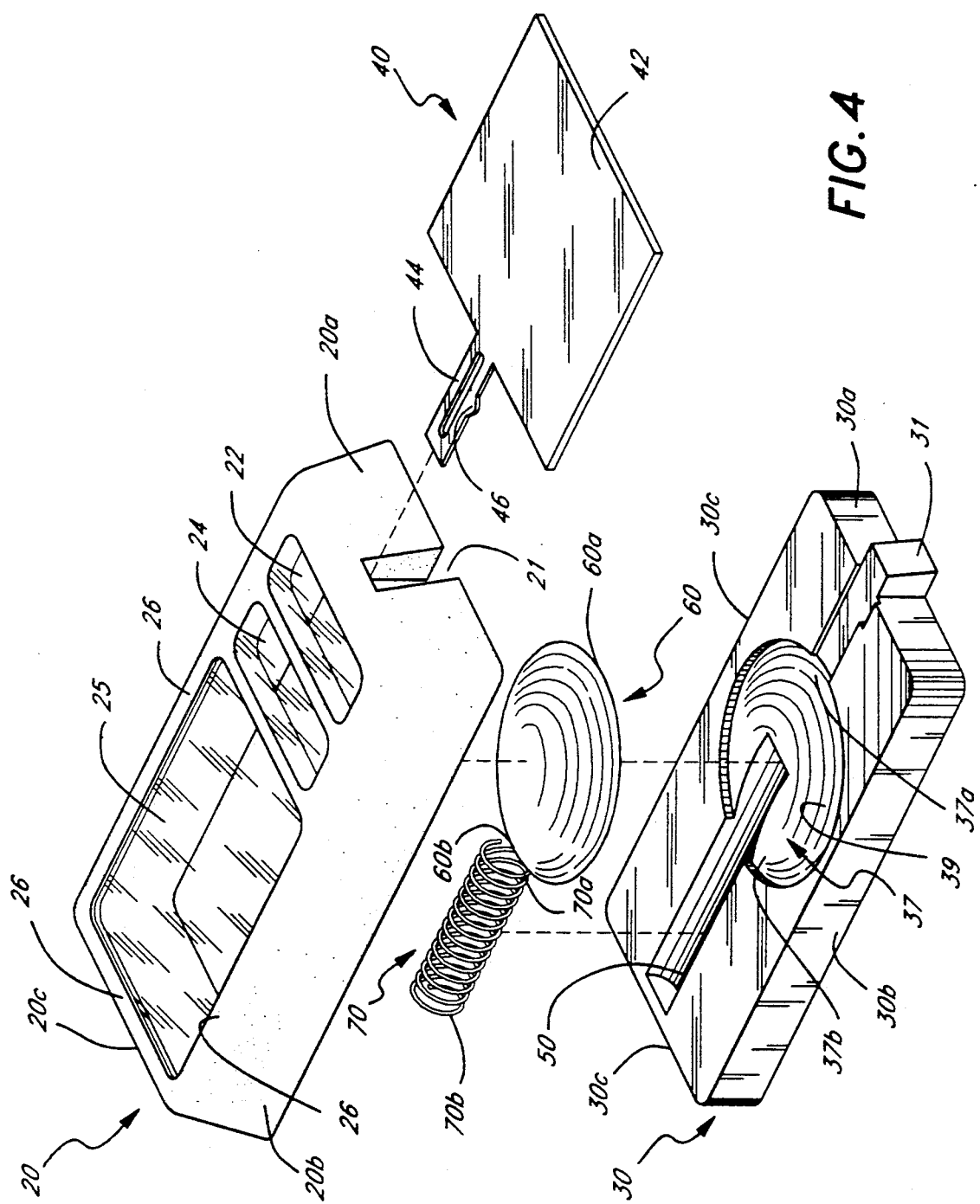

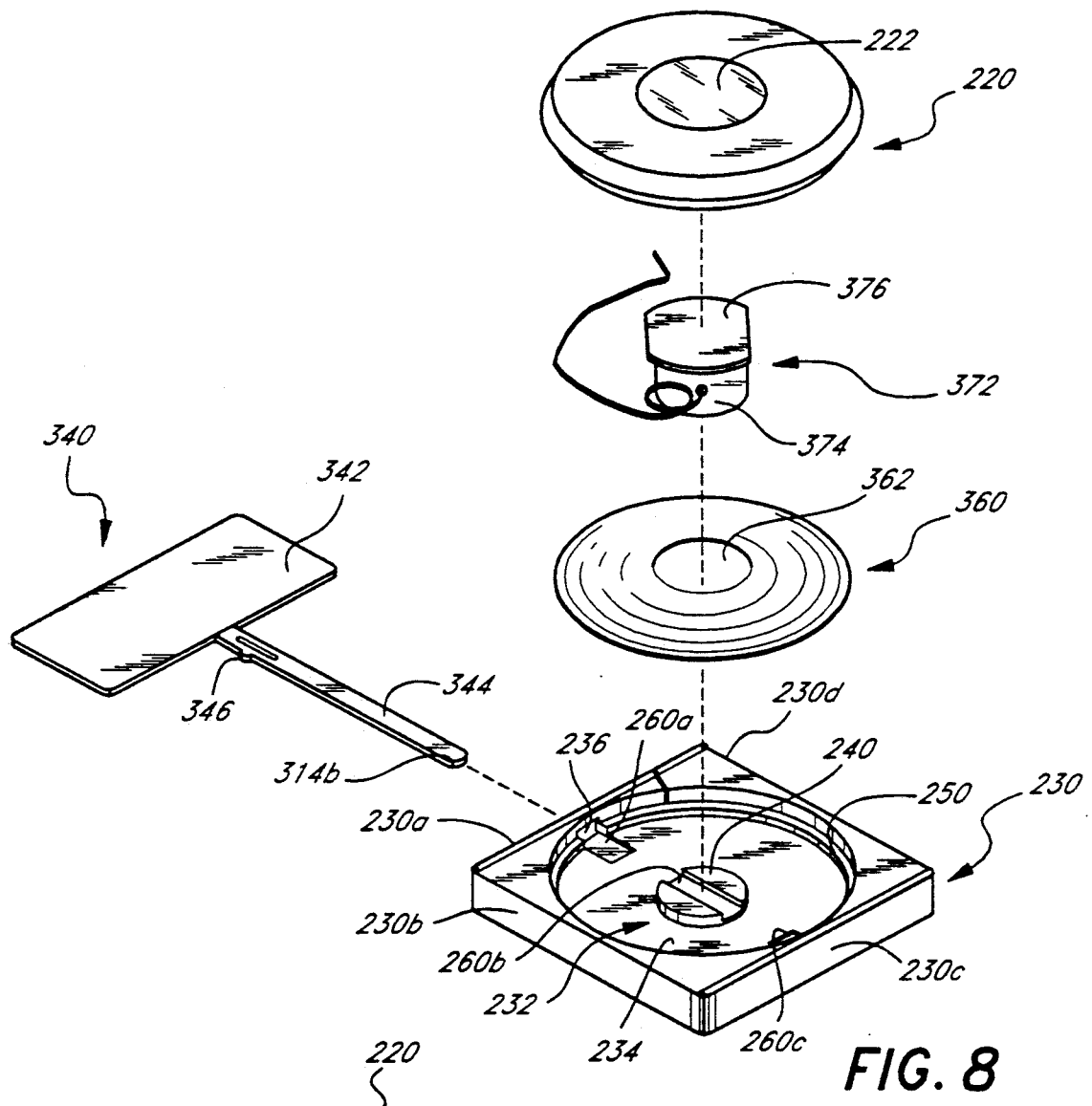
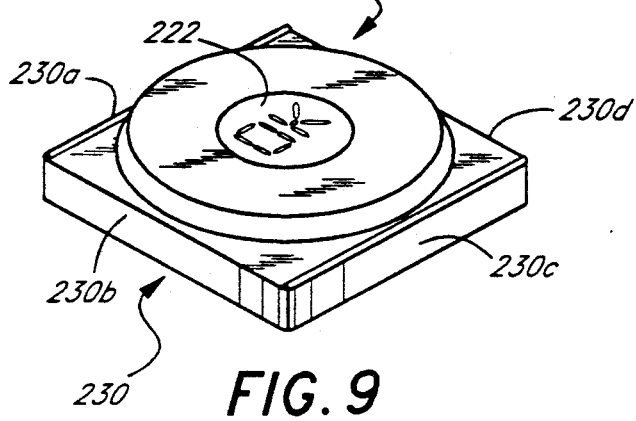
FIG. 8
FIG. 9

TEMPERATURE INDICATOR

FIELD OF THE INVENTION

The present invention relates to temperature indicating devices. More specifically it relates to devices which permanently indicate whether or not the device has ever been exposed to a predetermined temperature.

DISCUSSION OF PRIOR ART

Determining whether or not a parcel has been exposed to a predetermined temperature may be of great importance. Devices can be attached to a parcel to determine whether or not the device, and consequently the parcel, have been exposed to a predetermined temperature. This is critical in a variety of situations, including the shipping and storage of food and medicine, especially across zones where great temperature extremes may exist.

Devices like these are not thermometers. They do not indicate the ambient temperature at the time of inspection. They permanently record whether, at any time, the parcel and device have been exposed to some predetermined temperature that has been deemed hazardous to the contents of the parcel.

In the past, a number of different methods have been employed for indicating whether a specified temperature had been reached at any time since activation of the temperature recording device. Specialized recording thermometers have been used, but are considered undesirably expensive. There are paints and coatings that permanently change color once they have been exposed to a predetermined temperature, but these coatings do not cover a wide enough range of temperatures to be useful in a broad range of applications. Also, such paints can change color prematurely and then cannot be used for their intended purpose.

Other devices generally known to indicate whether a predetermined temperature has been reached are bimetallic elements. Bimetallic elements change shape rapidly and significantly as a result of being exposed to a specified temperature. Typically, a bimetallic element is created by bonding one metal, such as beryllium, to another metal, such as copper, where the two metals have different coefficients of expansion. The device is forced to bend to relieve pressure caused by the different rates of expansion. The coefficients of expansion of each of the metals is known. This information allows particular metals to be chosen to work in conjunction such that a bimetallic element formed of the metals changes configuration when the bimetallic material has been exposed to a predetermined temperature.

The use of bimetallics is well known in the art. Bimetallics are typically used in thermostats, the automatic chokes of automobiles, and automatic appliance controls, such as in coffee pots. Some devices incorporating bimetallics, for example thermostats, do not permanently record having been exposed to a given temperature. These devices change when the ambient temperature is beyond a predetermined temperature limit and then change back to their original form once the ambient temperature no longer exceeds the predetermined limit. This quality is useful in some situations, but is not useful for permanently recording whether a device, and consequently a parcel to which a device is attached, has been exposed to a predetermined temperature.

Devices incorporating bimetallics to permanently move an indicator have been utilized with moderate success to record whether a parcel has been exposed to a predetermined temperature at any point during its journey or its storage. Generally, these devices restrain an indicator in a particular position. The indicator, in conjunction with the bimetallic element, reveals whether or not the device has been exposed to a predetermined temperature.

One such device incorporating a bimetallic element is disclosed in U.S. Pat. 4,064,827 to Darringer, et al. A flat bimetallic element with an aperture in the center is stressed by cupping it until it becomes convex. It is placed within a plastic container approximately the size of the element. The element is convex, its apex facing the cover. The cover of the container is transparent, providing a viewing window. A pedestal extends toward the center of the element to just below the edge of the element. A disk is placed on top of this pedestal such that it rests in the center of the bimetallic element. The disk is sandwiched against the viewing window. Thus, the pedestal, element with an aperture in the middle, and cover restrain the disk from moving off the pedestal. The disk in the center of the viewing window indicates that the device has not experienced a temperature extreme enough to change the shape of the bimetallic element.

At a predetermined temperature, the bimetallic element snaps into a concave configuration and the indicator disk is no longer held in place on the pedestal below the center of the viewing window. If the device is not horizontal, the disk will slip off the pedestal by the force of gravity, indicating that the device has been exposed to the predetermined temperature. However, if the device is horizontal the disk can remain on the pedestal. Jostling could knock the disk off the pedestal, but if the device is not disturbed the disk will not move. Thus, an observer will think that the device has not been exposed to the predetermined temperature. Additionally, there is no assurance that the disk cannot re-acquire its original position on the pedestal.

Although these devices are relatively inexpensive to manufacture, they occasionally give false indications of having been exposed to the predetermined temperature. As discussed above, there is no guarantee that they will function as intended without outside forces such as gravity or jostling. Additionally, as discussed above, there is no guarantee that the indicator disk will remain separated from the pedestal, and thus absent from the viewing window, after the bimetallic disk has snapped and released the disk. Furthermore, the necessity that these devices can be placed non-horizontally is problematic, as discussed above. A device that can give a position activation without need for a definite orientation is more desirable.

Another device incorporating a bimetallic element is disclosed in U.S. Pat. No. 3,290,942 to Carbaugh et al. One embodiment of the temperature indicating device disclosed in this patent employs a bimetallic element and a spring enclosed in a generally rectangular housing. One end of the housing is open. Fitted inside this opening is a generally rectangular block which acts as an indicator of whether or not the device has been exposed to a predetermined temperature. When the block is inside the housing the device has not been exposed to the predetermined temperature. However, when the block moves forward, out of the housing, the device has been exposed to the predetermined temperature. Just below the block is a recess in the bottom wall of the housing. A bimetallic element, which is generally disk shaped, is bonded to the recess by welding, adhesive, or a tab extending from the element through a notch in the bottom wall's recess, for example. The disk is oriented such that it is concave, its apex facing the bottom wall of the housing.

The indicator block has a notch just above the forward edge of the disk such that the forward edge of the disk fits into the notch. A spring is mounted behind the indicator and is compressed when the forward edge of the disk is coupled with the notch in the indicator. So long as the bimetallic disk does not change configuration, the indicator block is held in place by the coupling of the disk and the notch. Thus, in the un-activated configuration of this device described above, the spring is compressed.

When the predetermined temperature is reached, the bimetallic disk snaps into concave form, its apex facing the top wall of the housing. The forward edge of the disk snaps away from the notch in the indicator block. Thus, the spring is able to push the block forward, out of the housing, indicating that the device has been exposed to the predetermined temperature.

Another device incorporating a bimetallic element and a spring is disclosed in U.S. Pat. No. 3,622,932 to Cunavelis. A bell shaped housing has a narrow top and an enlarged bottom. A cavern occupies a portion of the enlarged bottom. Two notches are located approximately at the midpoint of the cavern height, one on a first inner wall and one on an inner wall opposite the first. Portions of the edge of a bimetallic disk fit within these notches, thereby supporting the disk in the cavern, above the bottom of the housing. The disk is oriented such that it is concave, its apex facing the bottom wall of the housing.

A hollow cylinder extends from the top of the cavern, through the center of the narrow, top portion of the housing. A cylindrical indicator is mounted within the hollow cylinder, its bottom end touching the top of the bimetallic disk. The other end of the indicator is located just below the top of the housing, which is open such that the indicator can extend out of the housing. A ribbon-like latch, bent back and forth several times, is also mounted within a portion of the cylinder. The latch is held at one end by a notch located in the cavern, above one of the notches holding the bimetallic disk. The spring contacts the cylindrical indicator at several of the points where the latch is bent. The indicator has a notch located such that in the unactivated configuration of the device, as described above, the latch is not in contact with the notch.

When the bimetallic element is exposed to a predetermined temperature, it begins to change shape, snapping into a convex configuration. The disk thereby pushes the indicator upwardly, out of the top of the housing. The indicator continues to move upwardly, by the force of the bimetallic disk, until a bend in the latch contacts the notch, thereby stopping the motion of the indicator and holding it in an extended position. Thus, the device permanently indicates that it has been exposed to the predetermined temperature.

In both the Carbaugh and the Cunavelis patents described above, the device may not operate as described. The bimetallic disk may be exposed to the predetermined temperature during shipping of the device, thereby prematurely indicating that the device has been exposed to the predetermined temperature. There is no assurance, such as a locking mechanism, that the device will not activate prematurely. Furthermore, the indicator in each device protrudes from the device to indicate that the device has experienced the predetermined temperature. Thus, special precautions must be taken in using the device to ensure that the indicator has space available to extend out of the device and that the indicator does not accidentally become pushed back in after the device has experienced the predetermined temperature.

For a temperature indicating device to be commercially acceptable it must be useful in a number of applications. It must be simple enough that it can be easily and inexpensively produced. It must also be simple to use, not requiring specific conditions, such as extra space, for its use. Most importantly, it must be highly reliable to insure that a parcel's contents are not inadvertently consumed after being exposed to damaging temperatures. There is great need for an accurate and inexpensive device for permanently indicating temperature experiences, especially temperatures to which a parcel containing perishables may be exposed.

SUMMARY OF THE INVENTION

The present invention is an improved temperature indicating device that permanently records whether the device has been exposed to a predetermined temperature after being activated. This device uses a convex bimetallic disk wherein its outer circumference is wedged into a low-walled, recessed area on the inside of the device housing. On the side of the device housing opposite the recessed area is a viewing window. The apex of the convex disk faces the side of the device which contains the viewing window. However, when the device has not been exposed to the predetermined temperature, the disk cannot be seen in the viewing window. At one point of the outer circumference of the disk, a compressed spring applies pressure to the disk.

When the device is exposed to the predetermined temperature, the bimetallic disk snaps into a concave shape. Its edges are no longer wedged into the recessed area and the spring forces the disk forward, out of the recessed area, such that the disk rests underneath the viewing window. Thus, the disk can be seen in the viewing window and it is clear that the device has been exposed to the predetermined temperature. Additionally, the disk may be painted a distinct color from the color of the device housing such that it is easy to identify when it is underneath the viewing window.

Even if the temperature recedes and the disk snaps back into a convex position, it cannot return to its original position. Thus, the device permanently indicates that it has, at one time, been exposed to the predetermined temperature.

Additionally, there is a locking mechanism for the pre-use period that keeps the device from activating even if it is exposed to the predetermined temperature. Only with this locking mechanism removed will the device be able to record its temperature experiences. This eliminates unwanted activation, for example, during initial shipment or storage of the device.

Another embodiment of the present invention discloses a temperature indicating device comprising a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold.

This embodiment also comprises a housing having an internal recess within which the bimetallic element rests when in its first direction of curvature and a spring which exerts a force on the bimetallic element and which holds the bimetallic element securely in the internal recess when the bimetallic element has the first direction of curvature and which ejects the bimetallic element from the recess when the bimetallic element changes to the second direction of curvature.

This embodiment may further comprise a bimetallic element which is constrained in the recess when it has the first direction of curvature by contact of an edge of the bimetallic element with a portion of a wall of the recess. Additionally, this embodiment may further comprise means for preventing the bimetallic element from returning to the internal recess after the bimetallic element changes from the first direction of curvature to the second direction of curvature even upon a return to the first direction of curvature. The means for preventing the disk from returning to the internal recess may attach the disk to the spring such that the disk cannot rotate its orientation with respect to the spring.

Also, the depth of the internal recess in this embodiment of the present invention may be varied along with edges of the internal recess. The varied depth of the internal recess may be manifested by an edge located closest to the spring when the spring is in a state which holds the bimetallic element securely within the internal recess having less depth than edges of the internal recess further away from the spring.

The internal recess this embodiment of the present invention has a floor which is spherically curved in a direction of curvature which is the same as the first direction of curvature of the bimetallic element. Further, this embodiment of the present invention may comprise at least one viewing window on the housing. The housing may be made of plastic which is transparent when polished and opaque when not polished and the viewing window may be a polished section of said housing. Additionally, the housing may further comprise a disk motion amplification means. This means may comprise at least one leg having a surface which rests adjacent a floor of said housing, defining a distance between the floor and the surface of the at least one leg which measures approximately the same as the width of the disk, thereby providing a slip fit retainer for an edge of the disk. The slip fit retainer may be located closest to the spring when the spring is in a state which holds the bimetallic element securely within the internal recess.

The housing of the device of this embodiment may further comprise at least one leg located above said internal recess within the housing, the leg having one surface which rests in close proximity to the disk when the disk is in a first direction of curvature resting within the internal cavity, thereby preventing the disk from exiting the internal cavity before the disk reverses its direction of curvature to the second direction of curvature. Additionally, this embodiment may further comprise a locking tab such that the bimetallic element is prohibited from changing from the first direction of curvature to the second direction of curvature until the locking tab is removed from the device even if the device is exposed to the predetermined upper threshold. Further, this embodiment may further comprise a generally rectangular recess located in a top portion of the housing, the recess creating flanges around edges of the top portion of the housing, the flanges protecting the device from damage. The generally rectangular recess may be transparent such that inner workings of said device are visible through the generally rectangular recess, thereby allowing examination of the quality of the interior and assembly of the device.

Another alternative embodiment of the present invention comprises a housing, the housing having a top casing and a bottom casing. The bottom casing has an upper and lower surface and a channel with a longitudinal axis. The channel leads into a circular recess, the circular recess having upstanding walls. The device further comprises a bimetallic disk, having a forward portion and a rear portion, stressed such that it becomes convex when observed from the bottom casing, the disk configured to rest in the recess in an unactivated state, the disk being capable of inverting such that the convex surface becomes concave when the disk is activated by being exposed to a predetermined temperature. The top casing of this embodiment of the present invention has an upper and lower surface. Additionally, the top casing has a viewing window located such that the disk cannot be seen in the viewing window when the device is unactivated and the disk can be seen in the viewing window when the device is activated. This embodiment also comprises a spring which, when the device is in the un-activated state, contacts an edge of the bimetallic disk, thereby securing the disk against the recess wall. Further, this embodiment comprises at least one forward leg located above the circular recess, protruding from a lower surface of the top casing. This one forward leg prevents the disk from exiting the circular recess before the disk inverts at the predetermined temperature. This embodiment of the present invention also comprises at least one rear leg protruding from the lower surface of the top casing, located in close proximity to the rear portion of the disk such that the rear leg and an upper portion of the bottom casing provide a slip fit retainer for the rear portion of the disk. Furthermore, this embodiment of the present invention comprises a locking tab having a handle and an extension, the extension entering the casing through a notch in the casing, the extension acting to ensure that the device can not activate prematurely.

Another aspect of the present invention is a temperature indicating device comprising a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold. The housing has an internal recess within which the bimetallic element rests when in its first direction of curvature. This embodiment further comprises a biasing member having a first state which exerts a force on the bimetallic element and which holds the bimetallic element in the internal recess when the bimetallic element has the first direction of curvature. The biasing member may also have a second state which forces the bimetallic element out of the internal recess when the bimetallic element reverses its direction of curvature to the first direction, the biasing member in the second state stopping the bimetallic element from returning to the internal recess even after the bimetallic element returns to the first direction of curvature when it cools to the temperature below the predetermined lower threshold. The housing in this embodiment of the present invention may further comprise at least one viewing window through which the bimetallic element can be seen when the bimetallic element is in one direction. The viewing window may be distinguished such that when the bimetallic element is seen through the viewing window it is apparent whether or not the device has activated at the predetermined upper threshold.

Yet another embodiment of the present invention is a temperature indicating device comprising a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold. This embodiment further comprises a housing having a window. Additionally, this embodiment comprises a spring which exerts a force on the bimetallic element, the spring having an semaphore which is visible through the window only when the bimetallic element has the second direction of curvature. This embodiment may further comprise an internal recess, the recess having upstanding walls which define edges of the internal recess. The internal recess retains the bimetallic element before the bimetallic element has been exposed to the predetermined upper threshold temperature. The internal recess may be shaped such that a floor of the internal recess is closely aligned with the bimetallic element in the first direction of curvature. The depth of the internal recess may be varied along the edges of the internal recess. This embodiment of the present invention may further comprise a locking tab such that the bimetallic element is prohibited from changing from the first direction of curvature to the second direction of curvature until the locking tab is removed from the device even if the device is exposed to the predetermined upper threshold temperature.

Still another embodiment of the present invention is a temperature indicating device comprising a housing having a window. Additionally, this embodiment comprises a donut shaped bimetallic element defining a central hole, the element being normally curved in a first direction which changes to a second direction of curvature when heated to a temperature above a predetermined upper threshold temperature. This embodiment further comprises a semaphore which is insertable in the hole of the bimetallic element and is held in a position by the element such that it is visible in the window when the bimetallic element has the first direction of curvature. The present embodiment further comprises a spring which exerts a force on said semaphore, such that when the bimetallic element changes to the second direction of curvature, the semaphore is released from the hole and the spring force moves the semaphore to a position within the housing where the semaphore is not visible through the window and the spring holds the semaphore in the position.

This embodiment of the present invention may further comprise a locking mechanism which comprises a channel having at least one section, the channel being located underneath the bimetallic element. The locking tab further comprises an extension which is insertable into the channel, the extension preventing the bimetallic element from changing direction of curvature until the locking tab is removed from the device, even if the device is exposed to the predetermined upper threshold temperature. The window of this embodiment of the present invention may comprise a filter which is layered with red and black filtering material, at least a portion of the black material cut away exposing only red filtering material, the red filtering material visible only when the semaphore is held beneath the viewing window.

A further embodiment of the present invention is a temperature indicating device comprising a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold. This embodiment further comprises a housing having an internal recess within which the bimetallic element rests when in its first direction of curvature. Further, this embodiment of the present invention comprises a biasing member which exerts a force on the bimetallic element which holds the bimetallic element securely in the internal recess when the bimetallic element has the first direction of curvature.

One further embodiment of the present invention is a temperature indicating device comprising a bimetallic element which is normally curved in a first direction, reverses its direction of curvature to a second direction of curvature when cooled to a temperature below a predetermined lower threshold and returns to its normal first direction of curvature when heated to a temperature above a predetermined upper threshold. This embodiment of the present invention further comprises a housing having an internal recess within which the bimetallic element rests when in its first direction of curvature. Additionally, this embodiment comprises a biasing member which exerts a force on the bimetallic element to hold the bimetallic element securely in the internal recess when the bimetallic element has the first direction of curvature. The biasing member in this embodiment may be a coil spring.

BRIEF DESCRIPTION OF THE DRAWINGS

FIG. 2 is a cross-sectional view of the first embodiment of the present invention in a locked position.

FIG. 3 is a cross-sectional view of the first embodiment of the present invention after activation caused by exposure to its predetermined temperature.

FIG. 4 is an exploded illustration of a second embodiment of the present invention.

FIG. 8 is an exploded illustration of a fourth embodiment of the present invention.

FIG. 9 is a perspective illustration of the assembled device of the fourth embodiment.

DETAILED DESCRIPTION OF THE INVENTION

Figure 1:
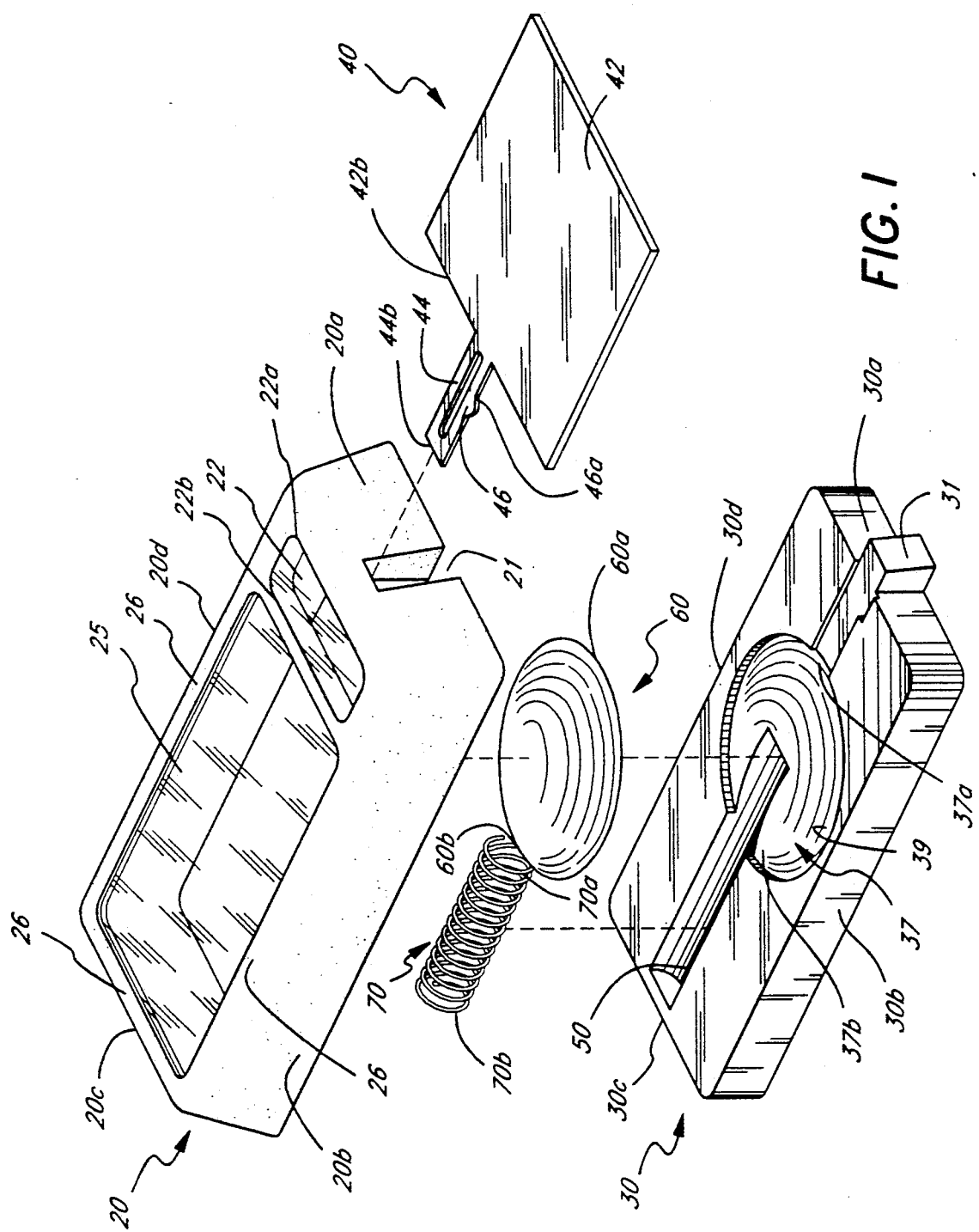
FIG. 1 is an exploded illustration of a first embodiment of the temperature indicating device of the present invention.

FIG. 1 shows an exploded illustration of the preferred embodiment of the present invention. FIG. 2 shows a crosssectional view of the preferred embodiment in a locked position, illustrating how the device is assembled. The device is formed of a top casing 20 and bottom casing 30, each of which is generally rectangular. The top and bottom casings 20 and 30, respectively, are formed of a rigid material such as molded plastic or manufactured metal like cast aluminum or machined steel. The preferred material is a plastic which is see-through when polished and is opaque when not-polished.

Referring to FIGS. 1 and 2, the bottom casing 30 is generally rectangular, having a nub 31 which extends from a forward sidewall 30a of the bottom casing 30. The top casing 20 and bottom casing 30 couple to form an enclosed housing for the device.

The bottom casing 30 has sidewalls 30a, 30b, 30c and 30d. A semi-cylindrical channel 50 begins at approximately the center of the inside edge of the rear sidewall 30c of the bottom casing 30 and extends slightly more than half of the length of the device. The channel 50 adjoins a spherical recess 37 such that the channel 50 terminates just past the center of the spherical recess 37. The spherical recess 37 is approximately one-half inch in diameter and has a slightly convex, spherical shaped floor 39. A forward edge 37a of spherical recess 37 is more deeply depressed than a rear edge 37b. Typical dimensions are approximately 25 thousandths of an inch high for the forward edge 37a and approximately 10 thousandths of an inch high for the rear edge 37b. The apex of the convex floor 39 is only slightly below the level of the upper surface of the bottom casing 30.

A bimetallic disk 60 having a diameter slightly smaller than the diameter of the spherical recess 37 is configured such that it assumes a convex shape. The bimetallic disk 60 is formed of two metals, for example, beryllium/copper. The bimetallic combination is determined by the characteristic temperature at which the device is intended to change configuration to a concave shape, i.e., to activate. The disk 60 is placed in the spherical recess 37 with its apex pointing away from the bottom casing 30. Thus, the spherical convex floor 39 of the spherical recess 37 and the convex bimetallic disk 60 are generally parallel, i.e., the shape of the disk 60 closely matches the shape of the floor 39.

Forward and rear edges 60a and 60b, respectively, of the convex disk 60 rest below the tops of the forward and rear edges 37a and 37b, respectively, of the spherical recess 37, thereby restraining the disk 60 in the spherical recess 37. Other shapes of bimetallic elements can also be used to produce similar results, e.g., rectangular, square, etc.

A spring 70, having a forward end 70a and a rear end 70b, fits such that the bottom half of the spring 70 rests within the channel 50. The spring 70 is of a strength such that, in a compressed state, the rear end 70b of the spring 70 touches the rear wall 30c of the bottom casing 30 and the front end 70a of the spring 70 can be held at the rear edge 37b of the spherical recess 37 by the disk 60 in the recess 37. The spring 70 is made of a material such as metal or plastic.

The top casing 20, having forward and rear walls 20a, and 20c, respectively, and sidewalls 20b and 20d, is of slightly larger rectangular dimensions than the bottom casing 30. Thus, the top casing 20 fits over the bottom casing 30, forming an enclosed housing. The forward wall 20a of the top casing 20 has a notch 21 cut at approximately the center of the forward wall 20a. The notch 21 accepts the nub 31 protruding from the bottom casing 30 such that a continuous, smooth forward wall is formed in the assembled device. However, the nub 31 fills only a portion of the height of the notch 21, thereby leaving an orifice 21a (shown in FIG. 2) which accepts a locking tab 40. The locking tab 40 has a handle 42 and a narrow extension 44 which fits into the orifice 21a. A small protrusion 46 extends from one side of the locking tab extension 44.

There is a generally rectangular viewing window 22 in the top casing 20. In the preferred embodiment, the window 22 is a highly polished, and therefore transparent, section of plastic. A forward edge 22a of the window 22 is located just to the rear of the forward wall 20a of the top casing 20, while, when the device is assembled, a rear edge 22b of the window 22 lies slightly forward of the forward edge 37a of the spherical recess 37. The window 22 is typically slightly less than a quarter of an inch long and a half an inch wide.

Located slightly to the rear of the viewing window 22, in the upper surface of the top casing 20, is a generally rectangular recess 25. This recess 25 covers a large portion of the upper surface of the top casing 20 which is not occupied by the viewing window 22. The floor of the recess 25 is highly polished, such that it is transparent. The recess 25 creates flanges 26 along the top of the rear wall 20c and portions of the top of the side walls 20b and 20d.

The lower surface of the top casing 20 has a semicylindrical channel (not shown) which runs parallel to the channel 50 in the bottom casing 30. The semi-cylindrical channel is of approximately the same length as the semi-cylindrical channel 50 and of radius such that the top half of the spring 70 can fit into the channel 80.

Referring to FIG. 2, two forward legs 90 (only one is shown) protrude downwardly from the lower surface of the top casing 20 on each side of the channel in the top casing 20. The forward legs 90 begin at the forward edge of the channel 50 and terminate at the rear edge 22b of the viewing window 22. A pair of rear legs 92 (only one is shown) also protrude from the lower surface of the top casing 20. The rear legs 92 are located at the rear edge 37b of the spherical recess 37, one leg 92 situated to each side of the forward legs 90. The rear legs 92 protrude from the lower surface of the top casing 20 slightly further than the forward legs 90.

To assemble the device, the bimetallic disk 60 is placed in the spherical recess 37 such that the disk 60 is aligned with the convex floor 39 of the recess 37. The spring 70 is placed in the semi-cylindrical channel 50. The spring 70 is compressed by pushing the rear edge 70b against the rear wall 30c of the lower casing 30 until the forward edge 70a of the spring 70 is aligned with the rear edge 37b of the spherical recess 37. The forward edge 70a of the spring 70 is then anchored by the rear edge 60b of the disk 60 which is in the spherical recess 37. The locking tab 40 is aligned such that a forward edge 46a of the locking tab protrusion is aligned with the forward wall 30a of the bottom casing 30. The locking tab extension 44 is thus aligned parallel to the nub 31. The rear end 44b of the locking tab extension 44 is located just above the forward portion of the disk 60.

The top casing 20 is placed over the bottom casing 30. When the device is assembled, the semi-cylindrical channel 50 in the bottom casing 30 and the semi-cylindrical channel in the top casing 20 unite to form a cylindrical channel 85 (shown in FIG. 2). The spring 70 is thus contained within the cylindrical channel 85. The bottom surfaces of the rear legs 92 rest just above the upper surface of the bottom casing 30, leaving a gap slightly wider than the disk 60 at the rear edge 37b of the spherical recess 37. The locking tab extension 44 is encased in the orifice 21a which occurs since the nub 31 is not as tall as the notch 21. Once the protrusion 46 is held inside the device by the edge of the notch 31, it is difficult to pull the locking tab 40 out of the device and the locking tab 40 does not fall out of the device.

An alternative method of assembling the device is to place the disk 60 in the circular recess 37 and compress the spring 70, as described above. However, in this method, the locking tab 40 is not placed over the bottom casing 30 before mating the top casing 20 with the bottom casing 30. When the top casing 20 is placed over the bottom casing 30, the notch 21 in the top casing 20 accepts the nub 31 in the bottom casing 30, leaving the orifice 21a. The locking tab extension 44 can thereafter be inserted into the orifice 21a. The locking tab extension 44 is propelled into the device until the protrusion 46 is fully within the device. Thus, the locking tab 40 is installed in the device such that its rear edge 44b again rests above the forward portion of the disk 60.

Independent of the method of assembly, when the device is fully assembled, the disk 60 cannot be seen through the viewing window 22. The flanges 26 around the recess 25 contribute extra strength to the device. If packages are stacked on top of each other and the temperature sensing device of the present invention is wedged in between, the weight of the top package will not damage the device. This is especially important when several packages are stacked for shipping and storage. The inner workings of the assembled device can be seen through the highly polished floor of the recess 25 in the top casing. This offers a viewing area through which the device can be checked for quality control. A label is typically placed over the recess 25 after quality is assured.

Within the device, the disk 60 is slip fit between the floor of the recess 37 in the bottom casing 30 and the lower surface of the rear legs 92 in the top casing 20. The spring 70 pushes on the rear edge 60b of the disk 60, thereby forcing the disk 60 against the forward edge 37a of the spherical recess 37. The apex of the convex floor 39 of the spherical recess 37 contacts the bottom surface of the apex of the convex disk 60. The contact points thus maintained on the disk 60 restrains the disk 60 within the recess 37. Additional assurance that the disk 60 remains in the recess 37 is provided by the forward legs 90. If the device is dropped or shaken, the disk may rise slightly away from the convex floor 39 of the spherical recess 37, thereby removing a point of contact which prevents the disk 60 from escaping confinement in the spherical recess 37. However, before the disk 60 can achieve enough altitude to escape the spherical recess 37, the lower surface of the forward legs 90 contact the disk 60, preventing it from leaving the spherical recess 37. Thus, as long as the disk 60 is in its convex configuration, the above described contact points retain the disk 60 within the spherical recess 37.

As long as the locking tab extension 44 is fully inserted into the device, the disk 60 is unable to change configuration from convex to concave. The rear edge 44b locking tab extension 44 rests just above a small section on the forward portion of the disk 60. Until the locking tab 40 is removed from the device, the top edge 60a of the disk 60 cannot curve upwardly to relieve bimetal stresses caused when the device is exposed to its predetermined temperature. In other words, the locking tab 40 prevents the disk 60 from inverting into concave configuration. As discussed above, the bottom edge 60b of the disk 60 is prevented from curving upwardly to relieve temperature induced bimetal stresses because it is slip fit between the rear legs 92 and the bottom casing 30. Consequently, as long as the locking tab 40 is inserted into the device, the edges of the disk 60 are restrained from inverting even if the device is exposed to the predetermined temperature, i.e., the device is locked.

The locking tab 40 is removed manually by pulling the handle 42 along the longitudinal axis, away from the device, until the protrusion 46 clears the orifice 21a and the locking tab extension 44 is fully removed. By removing the locking tab 40, the forward portion of the disk 60 is no longer restrained from inverting. As long as the disk 60 is not exposed to its predetermined temperature, the disk 60 maintains its convex configuration and is retained within the spherical recess 37 by the above described contact points. Thus, the disk cannot escape confinement in the spherical recess 37, even without the locking tab 40 inserted into the device, until it is exposed to its predetermined temperature. However, without the locking tab installed, the device can activate at the predetermined temperature.

When the device reaches the predetermined temperature at which the disk 60 becomes stressed enough to affect a change in its configuration, the bimetallic disk 60 will invert, such that it is concave. FIG. 3 shows a cross-sectional view of the preferred embodiment of the present invention after it has been exposed to its predetermined temperature and changed configuration, i.e., activated. Thus, FIGS. 2 and 3 illustrate the action of the device.

The inversion of the disk is not instantaneous. As the environment approaches the predetermined temperature, the disk 60 changes from convex to generally flat. Since the front edge 37a of the spherical recess 37 is more deeply recessed than the rear edge 37b of the spherical recess 37, the front edge 60a of the disk 60 remains beneath the top of the front edge 37a of the spherical recess 37, even when the disk 60 is in a flat configuration. When the predetermined temperature is actually reached, the disk 60 almost instantaneously changes from the flat configuration to a concave configuration. As discussed previously, since the rear edge 60b of the disk 60 is slip fit between the bottom casing 30 and the rear legs 92, the rear edge 60b of the disk 60 is inhibited from curving upwardly when the disk is exposed to the predetermined temperature. Thus, only the front edge 60a of the disk is free to move. Consequently, the disk 60 is forced to cant within the recess 37 and the motion at the front edge 60a of the disk 60 is greater than if the disk 60 was not restrained at the rear edge 60b. Typically, by restraining the rear edge 60b of the disk 60, the motion of the front edge 60a of the disk 60 is amplified by twice the height it would achieve if the rear edge 60b of the disk 60 were free.

Due to this amplification, the forward edge 60a disk 60 rises above the top of the forward wall 37a of the recessed area 37. Thus, the disk 60 is free to move out of the recesses 37 and will no longer keep the spring 70 compressed. Consequently, the compressed spring 70 will expand, forcing the disk 60 out of the spherical recess 37 and against the forward wall 30a of the device, as shown by the cross-sectional view in FIG. 3. At this time, the disk 60 can be seen through the viewing window 22. The disk is typically painted a color which is distinct from the color of the casings 20 and 30 such that it is easily distinguished when it is in the viewing window 22.

If the bimetallic disk 60 returns to its unstressed state by being exposed to a temperature within the range of the thermal reset temperature for the bimetal, it is impossible for the disk 60 to re-compress the spring 70 and thereby return to its original position within the spherical recess 37. Thus, when the disk 60 is visible in the viewing window 22, an observer knows that the parcel to which the device is attached has been exposed to a predetermined temperature.

In this manner, the device senses a predetermined temperature and irreversibly changes its configuration to warn an observer that the device has been exposed to this predetermined temperature. The types of metals used and the amount of stress induced in forming the concave shape of the bimetallic disk 60 determine at what temperature the disk 60 will invert.

The device is meant to be used only once, since the disk 60 moves out of the circular recess 37. However, it is possible to thermally reset the disk and return it to a convex configuration. The disk can then be manually pushed back into the circular recess 37 by inserting a prod into the orifice 21a and pushing the disk towards the rear of the device. This action re-compresses the spring 70 and re-sets the device.

However, even though the disk 60 can be thermally reset, it is extremely sensitive to and intolerant of resetting. The re-set temperature for the disk 60 may be substantially different than the predetermined activation temperature for the disk 60. It may be difficult or inconvenient to achieve a particular re-set temperature. Furthermore, if the disk 60 inadvertently received undue stress at some point after activation when it is free to move slightly within the casings 20 and 30, even thermetically resetting the disk 60 may not guarantee that the disk 60 is calibrated correctly. Consequently, the device is preferably used only once so that there is no question about the accuracy and calibration of the device.

The disk 60 cannot be accurately reset by forcibly pushing the apex into the opposite direction. This causes undue stress to be placed on the disk 60. When this occurs, there is no assurance and it is unlikely that the disk 60 will remain calibrated to invert at the predetermined temperature. The resultant change in activation temperature may be drastic. Thus, the disk 60 must be reset thermetically if it is to be re-set at all.

The device of the present invention is highly fault tolerant in manufacturing. The disk 60 is prohibited from prematurely relieving the stress induced to make it concave by the legs 92, the removable locking tab 40, the apex of the convex floor 39, and the force of the spring 70 pressing the disk 60 against the forward wall 37a of the spherical recess 37. The locking tab 40 forces the disk 60 to remain concave until the device is engaged and will not allow the device to activate prematurely. Additionally, the recessed front edge 37a and the legs 90 ensure that the disk 60 does not escape the spherical recess 37 prematurely even when the device is not locked. Furthermore, the amplification of disk 60 motion when the device reaches the predetermined temperature allows manufacturing tolerances to be relaxed. There is no necessity that the device be placed non-horizontally, or in any other specified arrangement, since the compressed spring 70 causes irreversible change in the device. Thus, no outside force, such as gravity, is necessary for accurate operation of the device. Furthermore, there is no need for intricate machining of the parts of the device since they may be produced of molded plastic or easily manufactured metal. Moreover, the device contains very few parts. Thus, it does not require great skill or expense to manufacture.

FIG. 4 shows an exploded illustration of a second embodiment of the present invention. This embodiment is similar to the above, first embodiment. However, this embodiment has a second viewing window 24 located adjacent the first viewing window 22. Again, in the preferred design of the second embodiment, the window 24 is a highly polished, and therefore transparent, section of the plastic casing. The lower portion of the bimetallic disk 60 can be seen in the second viewing window 24 when the device has not yet activated, i.e., exposed to its predetermined temperature. No portion of the disk 60 can be seen in the first viewing window 22.

An alternative indicator is to paint the lower portion of the disk 60 with a color, like green, or with a message, like "ok", to indicate that the device has not been exposed to its predetermined temperature. The disk 60 can be attached to the spring 70 so that it cannot rotate its orientation with respect to the spring 70. Thus, the correct message is displayed in the correct viewing window to indicate that the device has not activated.

When the device is exposed to its predetermined temperature, the bimetallic disk 60 inverts into a concave configuration, as in the first embodiment of the present invention. The disk 60 thereby escapes from its confinement in the spherical recess 37 and is pushed forward by the spring 70. The upper portion of the disk 60 can then be seen in the first viewing window 22. This indicates that the device has been exposed to its predetermined temperature and activated. No portion of the disk 60 can be seen in the second viewing window 24. The upper portion 60a of the disk 60 may be painted, with a color, like red, or a message, like "bad", to indicate that the device has been exposed to its predetermined temperature. When the disk 60 is attached to the spring 70, the disk 60 is prevented from rotating and displaying the wrong message.

Figure 6:
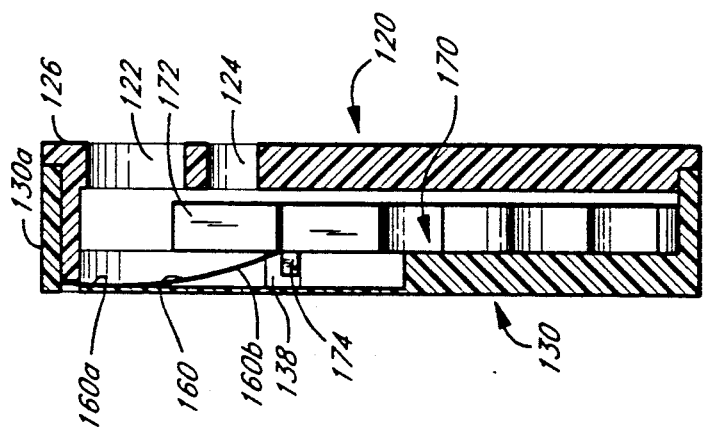
FIG. 6 is a side view of the third embodiment before exposure to its predetermined temperature.
Figure 5:
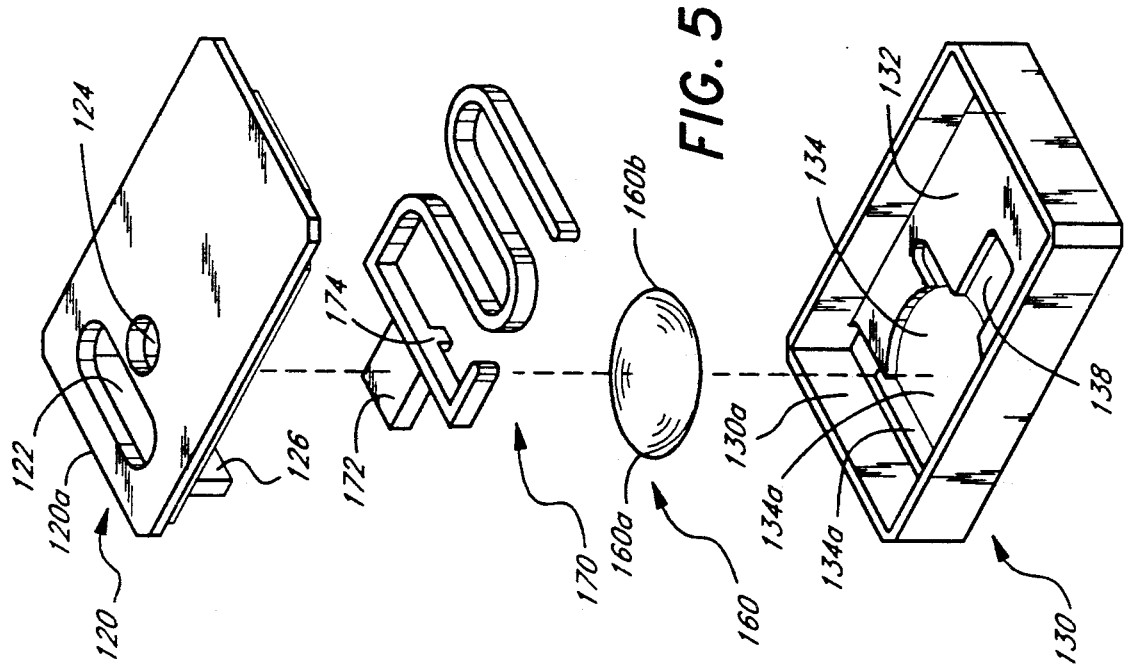
FIG. 5 is an exploded illustration of a third embodiment of the present invention.
Figure 10:
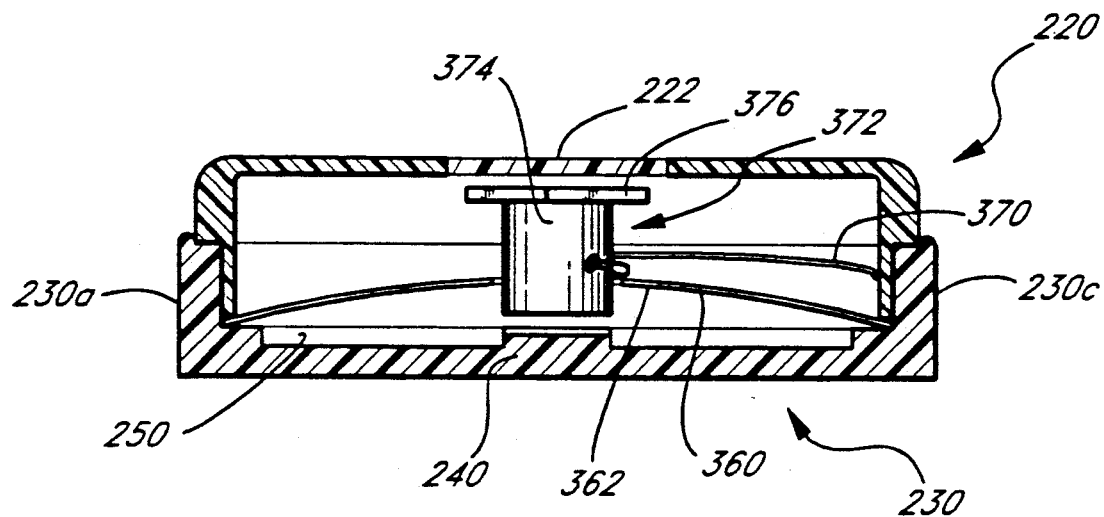
FIG. 10 is a cross-sectional view of the fourth embodiment before exposure to its predetermined temperature.
Figure 11:
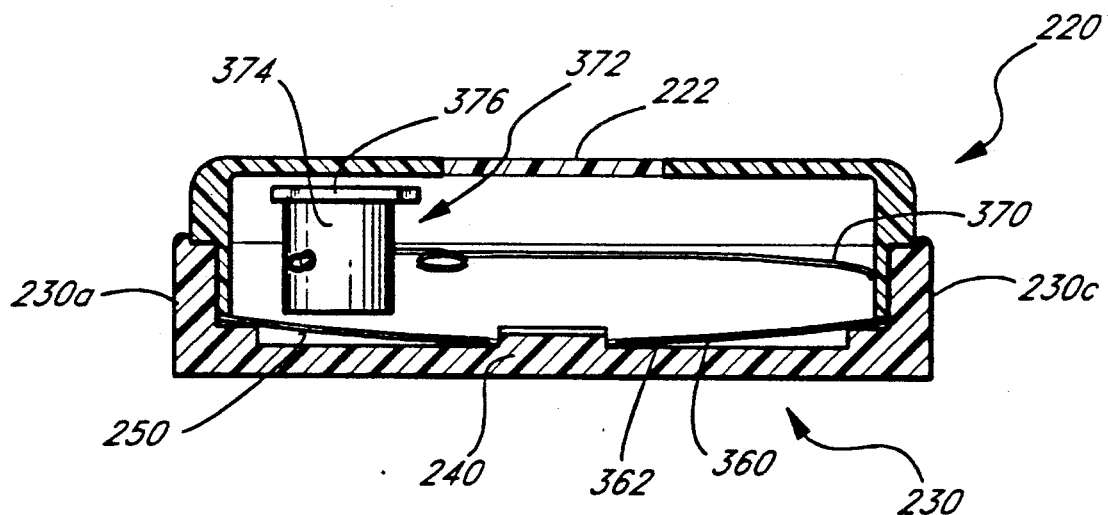
FIG. 11 is a cross-sectional view of the fourth embodiment after activation caused by exposure to its predetermined temperature.

FIG. 5 shows an exploded illustration of a third embodiment of the present invention. Referring to FIGS. 5 and 6, the third embodiment can be seen to differ from the first and second embodiments in the following respects. The device has generally rectangular top and bottom casings, 120 and 130 respectively, formed of a rigid material such as manufactured metal or molded plastic. The bottom casing 130 has a floor 132 in which a circular recess 134 is formed. A forward portion 134a of the circular recess 134 is intersected by a thin first rectangular recess 136 which is aligned parallel to a forward wall 130a of the device and is slightly further recessed than the circular recess 134. Additionally, a second generally rectangular recess 138, perpendicular to the first rectangular recess 136, intersects the rear edge of the circular recess 134.

A generally rectangular viewing window 122 is located near the forward edge 120a of the top casing 120, similar to the previous embodiment. Beneath the viewing window 122 is a small circular orifice 124. A generally rectangular protrusion 126 extends from the lower surface of the top casing 120, parallel to a forward edge 120a of the top casing 120, such that the bottom surface of the protrusion 126 rests just above the first rectangular recess 136 in the floor of the bottom casing 130.

In this embodiment of the present invention, instead of a disk 160 itself being the indicator as in the previous embodiments, a spring 170 now has an indicator 172 attached to it. The spring 170 is formed of a ribbon of plastic or metal folded back on itself multiple times. A protrusion 174 projects from the spring 170 just below the indicator 172.

To assemble this embodiment of the present invention, the disk 160, configured such that it is concave with the apex pointing away from the top casing 120, is placed in the circular recess 134 into floor 132 of the bottom casing 130. The spring 170 is then placed in the bottom casing 130, the protrusion 174 directed toward the bottom casing 130. Then the top casing 120 is coupled with the bottom casing 130. The projection 126 from the lower surface of the top casing 120 contacts a top edge 160a of the disk 160 and forces the disk 160 to cant within the recess 134 such that the top edge 160 of the disk 160 is pushed downwardly and a bottom edge 160b of the disk 160 is pushed upwardly.

To enable the device, a lever (not shown) is placed into the small circular orifice 124 and used to compress the spring 170 towards a rear wall 130c of the bottom casing 130. The protrusion 174 moves rearward in the channel 138, past the rear edge 160b of the disk 160. Then the lever is removed from the orifice 124 and the spring 170 expands slightly until the protrusion 174 makes contact with the raised bottom edge 160b of the disk 160. The raised bottom edge 160b of the disk 160 acts as a latch for the protrusion 174 and ensures that the spring 170 remains compressed as long as the device has not experienced a predetermined temperature. The compressed spring 170 forces the top edge 160a of the disk 160 against a forward wall 130a of the bottom casing 130. Thus, the spring 170 and the disk 160 are fixed in place, keeping the indicator 172 removed from the viewing window 122, prior to activation of the device at its predetermined temperature.

Figure 7:
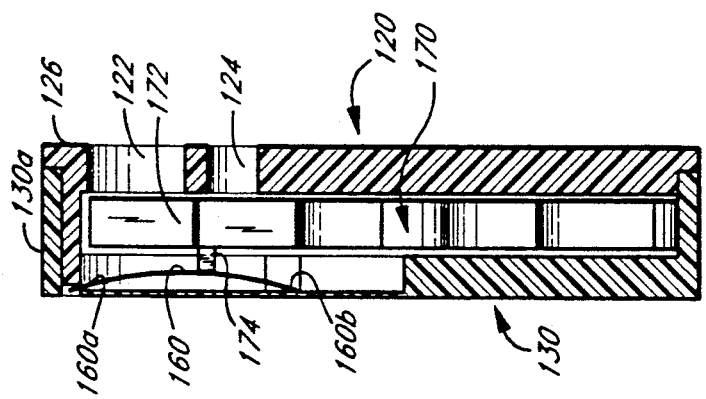
FIG. 7 is a side view of the third embodiment after activation caused by exposure to its predetermined temperature.

When the device is exposed to its predetermined temperature, the disk 160 will invert into a convex configuration as shown in FIG. 7. Thus, FIGS. 6 and 7 show the action of the device. The protrusion 174 on the spring 170 is no longer held by the bottom edge 160b of the disk 160 after the disk 160 inverts into a concave configuration, thus releasing the spring 170 from compression. The spring 170 expands forward in the device, pushing the indicator 172 forward so that it can be seen through the viewing window 122. An observer knows that if the indicator 172 is seen in the viewing window 122, the device has been exposed to the predetermined temperature at which the bimetallic disk 160 inverts.

This embodiment contains very few parts. It does not require forces other than those supplied by the spring 170 and the disk 160 to operate, nor does it require great skill or expense to manufacture. Additionally, once the device activates, the spring 170 cannot re-compress itself such that the device would return to its original position. This assures that the user obtains accurate information about whether or not the device has been exposed to its predetermined temperature.

An exploded illustration of a fourth embodiment of the present invention is shown in FIG. 8 while FIG. 9 shows a perspective illustration of the assembled device. This embodiment of the present invention is generally square. The top and bottom casings 220 and 230 are formed of a rigid material such as manufactured metal or molded plastic.

The bottom casing 230 has a circular recess 232, the recess having a floor 234 of diameter which is approximately equal to the length of sides 230a, 230b, 230c and 230d of bottom casing 230. Thus, a substantial portion of the bottom casing 230 is recessed. A cylindrical pedestal 240 protrudes from the center of the circular recess 232. There is a shelf 250 extending around the edge of the circular recess 234. The shelf 250 is approximately the same height as the cylindrical pedestal 240.

A first wall 230a of the bottom casing 230 has a small orifice 236 which leads through the shelf 250. On the inside of the shelf 250, the orifice 236 meets a short, first section of a channel 260a, having approximately the same width as the orifice 236 and a depth slightly recessed from the floor 234. A second channel section 260b extends across the cylindrical pedestal 240, its bottom at approximately the same elevation as the floor 234. A notch (not shown), directly opposite the orifice 236, cuts through the shelf 250 but not through the sidewall 230c in which it is located. A third channel section 260c leads to the notch.

There is a thin notch 270 which holds a small diameter piece of wire 370 in the first wall 230a. This wire 370 is coiled loosely and positioned inside the device such that it performs as a spring. The opposite end of the spring 370 accommodates an indicator reflector 372. The indicator reflector 372 is a generally cylindrical column 374 having an extended flat table 376 on one end. The column 374 has approximately the same diameter as the cylindrical pedestal 240 at the center of the circular recess 232. The table 376 is made of a generally shiny substance, such as a reflective material like polished aluminum or coated mylar.

The top casing 220 of the device is a generally circular cap which fits over the circular recess 232 of the bottom casing 230. It has a circular aperture, or viewing window 222, at its center which is approximately one-third the diameter of the top casing 220. This viewing window 222 is covered by a red filter. A second, black filter is placed adjacent this red filter. The black filter has a part of it cut away, generally in a pattern which expresses a message, such as "OK", indicating that the device has not been activated.

A convex bimetallic element 360 having and aperture 362, made, for example, of beryllium/copper, is placed in the circular recess 232 of the bottom casing 230 with its apex pointing toward the top casing 220. The aperture 362 at the center of the element 360 has diameter which is large enough to permit the cylindrical pedestal 240 to extend through the aperture 362. The indicator reflector 372 is placed over the cylindrical pedestal 240 at the center of the bottom casing 230. The indicator reflector's cylindrical column 374 is placed through the aperture 362 at the center of the element 360 and the silvered table 376 rests above the element 360. The spring 370 is tensioned such that if the indicator reflector 372 were not held in place by the aperture 362 at the center of the element 360, the spring 370 would move the reflector 372 away from the pedestal 240.

Also illustrated in FIG. 8 is a locking tab 340, similar to the locking tab 40 of the first two embodiments of the present invention. The locking tab 340, again, has a handle 342 and a locking tab extension 344. A protrusion 346 is located on the locking tab extension 344, near the handle 342.

To complete assembly of the device, the top casing 220 is placed over the bottom casing 230. Then the locking tab 340 is inserted into the device. The locking tab extension 344 can enter into the interior of the device through the orifice 236. Once inside, the locking tab extension 344 fits into the first channel section 260a, underneath the convex bimetallic element 360. As the extension 344 is inserted further into the device, the extension 344 passes the end of the first channel section 260a and rests on the floor 234. The second channel section 260b allows the extension 344 to continue across the device. The end of the locking tab extension 344b is caught in the third channel section 260c and is thereby led into the notch. Thus, the locking tab extension 344 extends across a diameter of the device, generally resting on the floor 234 of the circular recess 232.

With the top and bottom casings 220 and 230 coupled, the viewing window 222, with its red and black filter mechanism, is situated directly over the indicator reflector 372. The table 376 of the indicator reflector 372 faces the viewing window 222. Thus, wherever the black filter is cut away, the luminescence of the table 376 reflects light which enters the viewing window 222 back towards an observer. The observer can see in red the message which was formed by cutting away portions of the black filter. Thus, when the device has not been activated, an observer will see a message indicating this and will know that the device has not been exposed to its predetermined temperature.

As long as the locking tab 340 is inserted in the device as described above, the indicator reflector 372 is locked in place beneath the viewing window 222. The locking tab extension 344 obstructs the center of the element 360 from inverting downwardly such that the element 360 is in a concave configuration, even if the device has reached its predetermined temperature. Thus, the bimetallic element 360 cannot release the indicator reflector 372 from its captivity in the aperture 362 in the center of the element 360, i.e., the device is locked.

To activate the device, the locking tab 340 is manually removed by pulling the handle 342 away from the device such that the protrusion 346 is removed from the orifice 236 and the locking tab extension 344 is entirely removed from inside the device. Even without the locking tab 340 inside the device, the bimetailic element 360 stays in convex form until the device is exposed to a predetermined temperature. Upon exposure to this predetermined temperature, the element 360 inverts into concave form to relieve stress caused by the different expansion coefficients of the metals making up the bimetallic element 360. The indicator reflector 372 is thereby released from its confinement in the aperture 362 in the center of the element 360. The spring 370 then forces the indicator reflector 372 away from underneath the viewing window 222. When the indicator reflector 372 is not beneath the viewing window 222, incoming light is no longer reflected. Thus, the window 222 appears black, warning the observer that the device has been exposed to its predetermined temperature and, thus, has activated. The indicator reflector 372 cannot re-compress the spring 370 and become re-positioned under the viewing window 222. Thus, the device has been changed to a configuration which is irreversible without the aid of external forces.

This embodiment contains very few parts. It does not require outside forces to operate. The spring 370 insures the device is irreversibly changed. Once the device activates, it cannot return to a ready position, thereby insuring the user accurate information about whether or not the device has been exposed to its predetermined temperature.

Each of these embodiments can be manufactured such that it can sense a temperature in either ascending or descending fashion. Ascending devices are placed on packages which are to be kept at cool temperatures. Ascending devices activate when they are subjected to temperatures which are warmer than their predetermined temperature. Descending devices are placed on packages which are to be kept at warm temperatures. Descending devices activate when they are subjected to temperatures cooler than their predetermined temperature. Whether the device is ascending or descending is determined by the composition and orientation of the bimetallic element.

On descending devices an additional irreversible temperature indicating label may be added for high temperature information. Labels such as these are commercially available and are well known in the art. They are adhesive backed chips of material, such as paint, that permanently change color at a predetermined temperature. These materials do not work in the lower temperature ranges, necessitating other temperature indicating devices such as the present invention. However, these labels applied to a descending device give that device the capability to sense both a predetermined low temperature and a predetermined high temperature. Thus, the device can be used in a greater number of applications, especially those in which the device travels over highly varied temperature zones.

One skilled in the art will recognize that the present invention is not limited to the embodiments described above. The present invention applies to all temperature sensing devices with a bimetallic element that additionally incorporate a spring element that irreversibly changes the device after the bimetallic element has changed state once. One skilled in the art will realize that the present invention can employ any suitable bimetal, and additionally, that the device itself can be manufactured using any suitable material.

What is claimed:

1. A temperature indicating device comprising:
   a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold;
   a housing having an internal recess within which said bimetallic element rests when in its first direction of curvature; and
   a spring which exerts a force on said bimetallic element and which holds the bimetallic element securely in said internal recess when said bimetallic element has said first direction of curvature and which ejects said bimetallic element from said recess when said bimetallic element changes to said second direction of curvature.

2. A device as defined in claim 1 wherein said bimetallic element is constrained in said recess when it has said first direction of curvature by contact of an edge of said bimetallic element with a portion of a wall of said recess.

3. A device as defined in claim 1, further comprising means for preventing said bimetallic element from returning to said internal recess after said bimetallic element changes from said first direction of curvature to said second direction of curvature even upon a return to said first direction of curvature.

4. A device as defined in claim 3, wherein said disk is attached to said spring such that said disk cannot rotate its orientation with respect to said spring.

5. A device as defined in claim 1, wherein the depth of said internal recess is varied along the edges of said internal recess.

6. The device as defined in claim 5, wherein said varied depth of said internal recess is manifested by an edge located closest to said spring when said spring is in a state which holds said bimetallic element securely within said internal recess having less depth than edges of said internal recess further away from said spring.

7. A device as defined in claim 1, wherein said internal recess has a floor which is spherically curved in a direction of curvature which is the same as the first direction of curvature of said bimetallic element.

8. The device of claim 1, further comprising at least one viewing window on said housing.

9. The device of claim 8, wherein said housing is made of plastic which is transparent when polished and opaque when not polished and said viewing window is a polished section of said housing.

10. The device as defined in claim 1, wherein, said housing further comprises a disk motion amplification means.

11. The device as defined in claim 10, wherein said disk motion amplification means comprises at least one leg having a surface which rests adjacent a floor of said housing, defining a distance between said floor and said surface of said at least one leg which measures approximately the same as the width of said disk, thereby providing a slip fit retainer for an edge of said disk.

12. The device as defined in claim 11, wherein said slip fit retainer is located closest to said spring when said spring is in a state which holds said bimetallic element securely within said internal recess.

13. The device as defined in claim 1, wherein said housing further comprises at least one leg located above said internal recess within said housing, said leg having one surface which rests in close proximity to said disk when said disk is in a first direction of curvature resting within said internal cavity, thereby preventing said disk from exiting said internal cavity before said disk reverses its direction of curvature to said second direction of curvature.

14. A device as defined by claim 1, further comprising a locking tab such that said bimetallic element is prohibited from changing from said first direction of curvature to said second direction of curvature until said locking tab is removed from said device even if said device is exposed to said predetermined upper threshold.

15. A device as defined by claim 1, further comprising a generally rectangular recess located in a top portion of said housing, said recess creating flanges around edges of said top portion of said housing, said flanges protecting the device from damage.

16. A device as defined by claim 15, wherein said generally rectangular recess is transparent such that inner workings of said device are visible through said generally rectangular recess, thereby allowing examination of the quality of the interior and assembly of said device.

17. A temperature indicating device comprising:
a housing, said housing having a top casing and a bottom casing;
said bottom casing having an upper and lower surface, said bottom casing having a channel with a longitudinal axis, said channel leading into a circular recess, said circular recess having upstanding walls; a bimetallic disk, having a forward portion and a rear portion, stressed such that it becomes convex when observed from said bottom casing, said disk configured to rest in said recess in an un-activated state, said disk being capable of inverting such that said convex surface becomes concave when said disk is activated by being exposed to a predetermined temperature;
said top casing having an upper and lower surface, said top casing additionally having a viewing window located such that said disk cannot be seen in said viewing window when said device is un-activated and said disk can be seen in said viewing window when said device is activated;
a spring which, when said device is in said unactivated state, contacts an edge of said bimetallic disk, thereby securing said disk against said recess wall;
at least one forward leg located above said circular recess, protruding from a lower surface of said top casing, said one forward leg preventing said disk from exiting said circular recess before said disk inverts at said predetermined temperature;
at least one rear leg protruding from said lower surface of said top casing, located in close proximity to said rear portion of said disk such that said rear leg and an upper portion of said bottom casing provide a slip fit retainer for said rear portion of said disk; and
a locking tab having a handle and an extension, said extension entering said casing through a notch in said casing, said extension acting to ensure that said device can not activate prematurely.

18. A temperature indicating device comprising:
a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold;
a housing having an internal recess within which said bimetallic element rests when in its first direction of curvature; and
a biasing member having a first state which exerts a force on said bimetallic element and which holds said bimetallic element in said internal recess when said bimetallic element has said first direction of curvature.

19. A device as described in claim 18, wherein said biasing member also has a second state which forces said bimetallic element out of said internal recess when said bimetallic element reverses its direction of curvature to said first direction, said biasing member in said second state stopping said bimetallic element from returning to said internal recess even after said bimetallic element returns to said first direction of curvature when it cools to said temperature below said predetermined lower threshold.

20. A device as described in claim 18, wherein said housing further comprises at least one viewing window through which said bimetallic element can be seen when said bimetallic element is in one direction, said viewing window being distinguished such that when said bimetallic element is seen through said viewing window it is apparent whether or not said device has activated at said predetermined upper threshold.

21. A temperature indicating device comprising:
a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold;
a housing having a window;
a spring which exerts a force on said bimetallic element, said spring having an semaphore which is visible through said window only when said bimetallic element has said second direction of curvature.

22. A device as defined in claim 21, further comprising an internal recess, said recess having upstanding walls which define edges of said internal recess, said internal recess retaining said bimetallic element before said bimetallic element has been exposed to said predetermined upper threshold temperature.

23. A device as defined in claim 22, wherein said internal recess is shaped such that a floor of said internal recess is closely aligned with said bimetallic element in said first direction of curvature.

24. A device as defined in claim 22, wherein the depth of said internal recess is varied along said edges of said internal recess.

25. A device as defined in claim 21, further comprising a locking tab such that said bimetallic element is prohibited from changing from said first direction of curvature to said second direction of curvature until said locking tab is removed from said device even if said device is exposed to said predetermined upper threshold temperature.

26. A temperature indicating device comprising:
a housing having a window;
a donut shaped bimetallic element defining a central hole, said element being normally curved in a first direction which changes to a second direction of curvature when heated to a temperature above a predetermined upper threshold temperature;
a semaphore which is insertable in said hole of said bimetallic element and is held in a position by said element such that it is visible in said window when said bimetallic element has said first direction of curvature; and
a spring which exerts a force on said semaphore, such that when said bimetallic element changes to said second direction of curvature, said semaphore is released from said hole and said spring force moves said semaphore to a position within said housing where said semaphore is not visible through said window and said spring holds said semaphore in said position.

27. A device as defined in claim 26, further comprising a locking mechanism comprising:
a channel having at least one section, said channel being located underneath said bimetallic element;
a locking tab having an extension which is insertable into said channel, said extension preventing said bimetallic element from changing direction of curvature until said locking tab is removed from said device, even if said device is exposed to said predetermined upper threshold temperature.

28. A device as defined in claim 26, wherein said window comprises a filter which is layered with red and black filtering material, at least a portion of said black material cut away exposing only red filtering material, said red filtering material visible only when said semaphore is held beneath said viewing window.

29. A temperature indicating device comprising:
a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold;
a housing having an internal recess within which said bimetallic element rests when in its first direction of curvature; and
a spring which exerts a force on said bimetallic element which holds said bimetallic element securely in said internal recess when said bimetallic element has said first direction of curvature.

30. A temperature indicating device comprising:
a bimetallic element which is normally curved in a first direction, reverses its direction of curvatures to a second direction of curvature when cooled to a temperature below a predetermined lower threshold and returns to its normal first direction of curvature when heated to a temperature above a predetermined upper threshold;
a housing having an internal recess within which said bimetallic element rests when in its first direction of curvature; and
a spring which exerts a force on said bimetallic element to hold said bimetallic element securely in said internal recess when said bimetallic element has said first direction curvature.

31. A temperature indicating device as defined in claim 30 wherein said spring is a coil spring.

32. A temperature indicating device comprising:
a bimetallic element which is normally curved in a first direction, reverses its direction of curvature to a second direction of curvature when heated to a temperature above a predetermined upper threshold and returns to its normal first direction of curvature when it cools to a temperature below a predetermined lower threshold;
a housing having an internal recess within which said bimetallic element rests when in its first direction of curvature; and
a resilient biasing member which exerts a force on said bimetallic element which holds said bimetallic element securely in said internal recess when said bimetallic element has said first direction of curvature.

33. A temperature indicating device comprising:
a bimetallic element which is normally curved in a first direction, reverses its direction of curvature to a second direction of curvature when cooled to a temperature below a predetermine lower threshold and returns to its normal first direction of curvature when heated to a temperature above a predetermined upper threshold;
a housing having an internal recess within which said bimetallic element rests when in its first direction of curvature; and
a resilient biasing member which exerts a force on said bimetallic element to hold said bimetallic element securely in said internal recess when said bimetallic element has said first direction curvature.

* * * * *